United States Patent [19]
Arenhold

[11] Patent Number: 5,048,868
[45] Date of Patent: Sep. 17, 1991

[54] MUD-FLAP ATTACHMENT DEVICE

[75] Inventor: Knut Arenhold, Hamburg, Fed. Rep. of Germany

[73] Assignee: Cona GmbH, Kehl, Fed. Rep. of Germany

[21] Appl. No.: 533,559

[22] Filed: Jun. 5, 1990

[30] Foreign Application Priority Data

Jun. 6, 1989 [DE] Fed. Rep. of Germany ....... 3918802

[51] Int. Cl.$^5$ .............................................. B62B 9/16
[52] U.S. Cl. .................................... 280/848; 280/851
[58] Field of Search ............... 280/847, 848, 154, 851, 280/155

[56] References Cited

U.S. PATENT DOCUMENTS

| 3,953,053 | 4/1976 | Arenhold | 280/851 |
| 4,099,736 | 7/1988 | Shiina | 280/851 |
| 4,323,262 | 4/1982 | Arenhold | 280/851 |
| 4,605,238 | 8/1988 | Arenhold | 280/851 |

OTHER PUBLICATIONS

Gebrauchsmuster (German Utility Model) G 83 29 615.8.
Patent Abstracts of Japan, vol. 6, No. 76, dated May 13, 1982—Abstract of Japanese Patent Application No. 55-87443 of Hirofumi Yamashita.

Primary Examiner—Andres Kashnikow
Assistant Examiner—Richard Camby
Attorney, Agent, or Firm—Griffin, Branigan & Butler

[57] ABSTRACT

In a mud-flap attachment for the detachable connection of the attachment region of a mud-flap (3) which rests on the fender fold (2), which mud-flap has a main flap body (4) and an extension thereof which forms an adapter protrusion (5) which has an attachment region. A clamp is used which has a first clamping part (10, 110) which is connected with a second clamping part (6, 106) via two screws (11, 12) spaced apart in the longitudinal extension of the attachment region. The side of the clamping part forming the clamp opening has a central recess facing away from the screws (11, 12). The sides of recess are formed by two clamping projections (13, 14). Two corner angle parts (17, 18) of the free ends (15, 16) of the clamping projection are angled towards the clamping part (10, 110). The distance from the associated screw (11) to the free end (15) of the upper clamping projection is less than the corresponding distance of the other clamping projection.

10 Claims, 4 Drawing Sheets

MUD-FLAP ATTACHMENT DEVICE

The invention relates to a mud-flap attachment device for detachably securing an attachment region of a mud-flap to a fender fold of a motor vehicle. The attachment region is formed on the mud-flap by an edge portion of an adapter protrusion of the flap which region rests on the angled edge or fender fold of the motor vehicle. The mud-flap has a main flap body extending from the adapter protrusion and at least one clamp is used for clamping the adapter protrusion of the mud-flap to the angled edge or fender fold. The clamp has a first clamping part which is connected to a second clamping part by at least two spaced apart screws.

BACKGROUND OF THE INVENTION

A known mud-flap attachment device of the present nature (see U.S. Pat. No. 4,323,262) is used for the clamping attachment of a mud-flap to a fender fold. The mud-flap is substantially universally usable and has a main flap body and an adapter protrusion lying in essentially the same plane as the main body. A clamp is used to secure the flap to a fender fold, and the clamp consists of an oblong first clamping part and a correspondingly shaped oblong second clamping part. These parts are connected to each other by at least two screws set apart from one another. The continuous sides of the clamp form the clamp opening which runs parallel to a theoretical line passing through the two screws, so that when clamped to the fender fold, a firm engagement of the clamping part with the inside of the fender fold and the mud-flap is achieved. In practice, however, it has been found that such a clamp is frequently not suitable for the application of clamping forces sufficient to hold the mud-flap firmly and securely to the fender fold.

Moreover, when the fender folds are of certain shapes, particularly when the angled edge of the fender fold or its free edge which points toward the middle of the vehicle is at a very steep angle and sometimes almost vertical, it can be difficult to bring the entire side of the clamping parts forming the clamping opening into contact with the angled edge or fender fold. This is because the clamp can be brought to correct alignment with the mud-flap only up to the point where the two screws lie against the inner edge of the adapter protrusion of the mud-flap. The shape of the angled edge or fender fold at this point deviates so greatly from the shape of the inner edge of the adapter protrusion of the aligned mud-flap that the angled edge or fender fold is outside of the clamp in the lower region thereof. In this case, the clamping forces that can be applied by only the upper region of the clamp are insufficient, by far, for securely connecting the mud-flap to the angled edge or fender fold, and the mud-flap may be dislodged from the fender fold, especially when the car is running.

It is the object of the invention to provide a mud-flap attachment device which may be in the form of only one clamp and yet enables the mud-flap to be securely attached to the angled edge or fender fold, even when the latter has an unusual shape. Thus, the flap and clamp can be used universally.

BRIEF DESCRIPTION OF THE INVENTION

To achieve this object, a mud-flap attachment device of the type mentioned above is constructed such that the side of the clamping part that forms the clamp opening has clamping projections, and the distance between associated screws and the free end of each clamping projection is different.

Thus, briefly stated, the present invention is in connection with an improvement in a mud-flap attachment device for detachably securing an upper portion of a mud-flap to a fender fold of a motor vehicle. The attachment device has at least one clamp, which clamp has a first clamping part connected to a second clamping part by at least an upper screw and a spaced-apart lower screw, so that the upper portion of the mud-flap and a portion of the fender fold may be received between the first and second clamping parts and inwardly of the screws, whereby the mud-flap is securable to the fender fold by tightening the screws.

The present improvement in that mud-flap attachment device is where there is an upper first clamping projection on an opposite side of the first clamping part from that side at which the upper screw is disposed. There is a lower first clamping projection on an opposite side of the first clamping part from that side at which the lower screw is disposed. There is an upper free outer edge on the upper first clamping projection and a lower free outer edge on the lower first clamping projection, and each of these edges have inwardly-directed corner angled parts for receiving and engaging the upper portion of the mud-flap or the fender fold. The distance between the lower screw and the lower free outer edge is greater than the distance between the upper screw, and the upper free outer edge, so that one of the clamping projections has a greater length than the other clamping projection, whereby the clamp can accommodate a wide variety of fender folds, even fender folds with steep angles therein.

Thus, in the mud-flap attachment device according to the invention, therefore, it is possible to use only one clamp, and that one clamp can effectively engage a wide variety of fender fold shapes. Further, in the present clamp, at least one clamping part has four corner regions on the outer edges of the clamping projections which have inwardly directed corner angle parts which angle towards the clamping part and which, when mounted, come into "clawing" engagement with the inside of the fender fold or with the insulation material or damping material provided on its inside. Thus, compared with the previously known clamp with two screws, a markedly greater clamping action is achieved, and as a result, a secure connection of the mud-flap with the fender fold is ensured.

Moreover, due to the different lengths of the clamping projections from the screws, it is also possible for all angled corner regions of these clamping projections to be in effective engagement with the fender fold, even a fender fold having a relatively steep angle. This is because the lower clamping projection, when mounted, due to its greater length is in contact with the rear side of the fender fold or the mud-flap even when the inner edge of the fender fold has an essentially steeper shape than the inner edge of the adapter protrusion of the aligned mud-flap.

The screws of the clamp are preferably each arranged on a longitudinal central axis of the associated clamping projection, so as to produce a symmetrical position as regards the corner regions of the clamping part which come into engagement with the rear side of the fender fold or the mud-flap.

In order to improve still further the attachment of mud-flaps to fender folds with sharp angles, the outer edge of the free end of at least the lower clamping projection (when mounted on the fender fold) will form an acute angle with a theoretical line generated through the two screws, the apex of which angle is upwardly of the upper screw. The outer edges of the free ends of the two clamping projections preferably lie on a common line when this is the case.

Due to the fact that in this case the lower corner region of the clamping projection is a greater distance from the screw than the upper corner region, a corresponding adaptation to steep angled edges is also achieved, along the width of the clamping projection, because, as described above, the lower regions of the clamping part when mounted are further away from the associated screw than the higher regions.

For easy assembly without the handling of numerous separate parts, tapped holes are provided in the clamping parts, i.e. either the first or second clamping part, to receive the screws, so that the screws can be arranged with their heads on the outside of a clamping part and can be tightened from that side, which is more easily accessible to the assembler, so as to bring the clamp into its closed state.

On the side of at least one clamping part remote from the clamping projection, at least one angle member, which forms a support, is disposed on a projecting part for engagement with the other clamping part. In a preferred embodiment, this angle member and projecting part are formed from a strengthening plate on the mud-flap. This plate extends, when mounted, to the area of the attachment region of the mud-flap facing away from the angled edge or fender fold, and the plate has projecting parts forming the angle member and for the engagement of the screws. This strengthening plate is known per se (see U.S. Pat. No. 3,953,053), but is used in the present invention as a clamping part. As the strengthening plate is normally riveted to the mud-flap, when the clamping projections of the clamping part have been appropriately positioned behind the angled edge of the fender fold and the mud-flap has been aligned, the clamp is fixed firmly while holding the mud-flap in place. It is, therefore, only necessary to tighten the screws of the clamp without there being any danger of the clamp being displaced in relation to the mud-flap and/or in relation to the angled edge of the fender fold during this assembly operation.

It is, of course, also possible to construct each clamping part to correspond to the other clamping part, and thus provide each clamping part with two clamping projections and an angle member. This achieves a more secure engagement of the clamp with the material of the mud-flap. In this case, the corresponding clamping projections of each clamping part can be of the same length.

It should also be noted that, by using a one-piece clamp instead of two separate components or clamps, the whole clamping or gripping region is opened and can be brought into the assembly position with one movement, while, in a structure with separate clamping components, this would require the two components to be opened and closed independently and thus with more difficulty.

The invention is explained in more detail in the following by means of the Figures.

DESCRIPTION OF PREFERRED EMBODIMENTS

Figure 1:
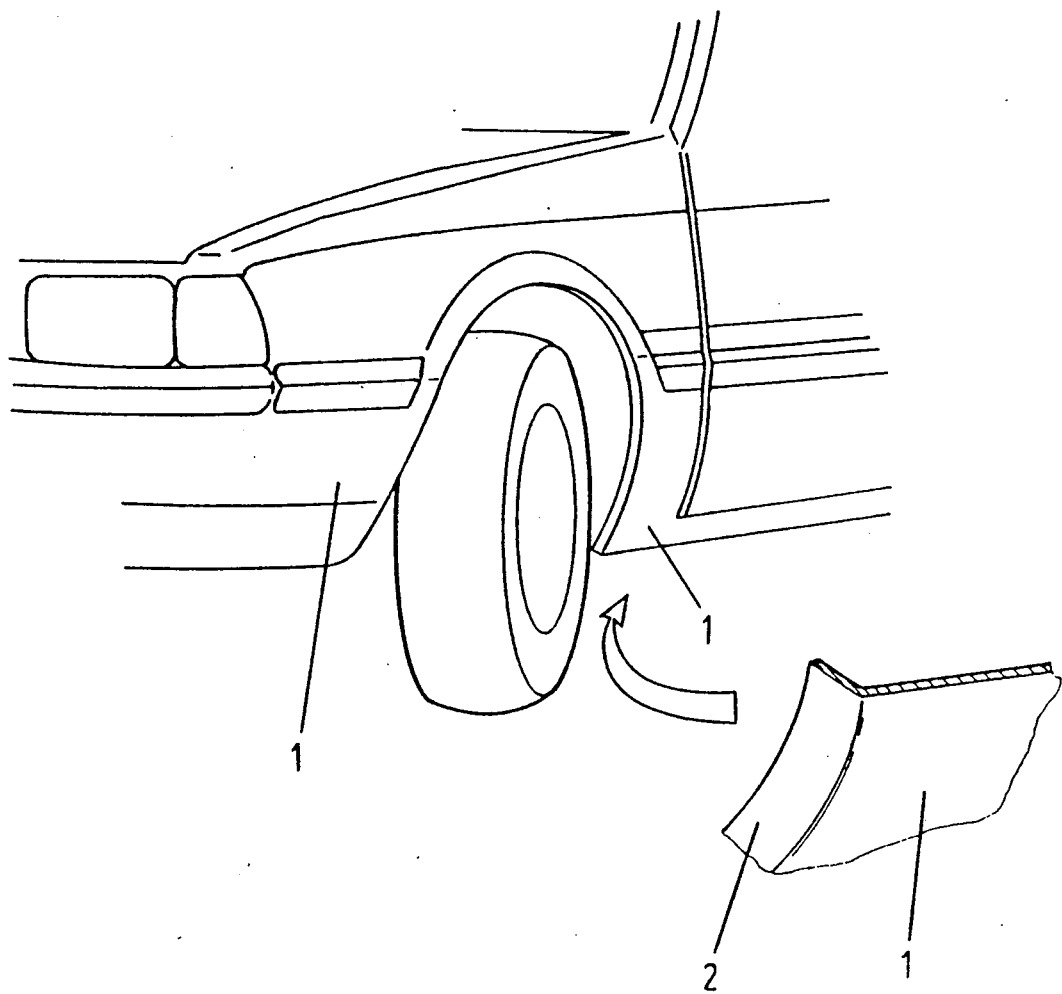
FIG. 1 shows a perspective part representation of the front, left-hand wheel-arch region of a car and an enlarged part representation of the angled fender fold in this region.

As shown in FIG. 1, passenger cars usually have a fender fold 2 .n the region of the wheel arch which is formed by angling the edge of the fender of the car body 1 in the region of the wheel arch and which in many cases serves for the attachment of mud-flaps, as described in U.S. Pat. No. 3,953,053 and also in U.S. Pat. No. 4,323,262. Such a mud-flap 3, as indicated with a dot-dash line in FIG. 2, has an essentially flat flap body 4 and an adapter protrusion 5 extending upwardly from flap body 4, which adapter protrusion forms with its inner edge region an attachment region which rests on the fender fold 2. The shape of the inner edge of the adapter protrusion 5 should match as closely as possible the shape of the free edge (inner edge) of the fender fold 2. Since, however, this would require the adapter protrusion to have a different shape for practically every style of car, compromises are made so that even with very considerable differences in the shapes of the inner edge of the fender fold 2 and the adapter protrusion 5, a secure attachment of the mud-flap 3 to the fender fold 2 still can be effected.

Figure 2:
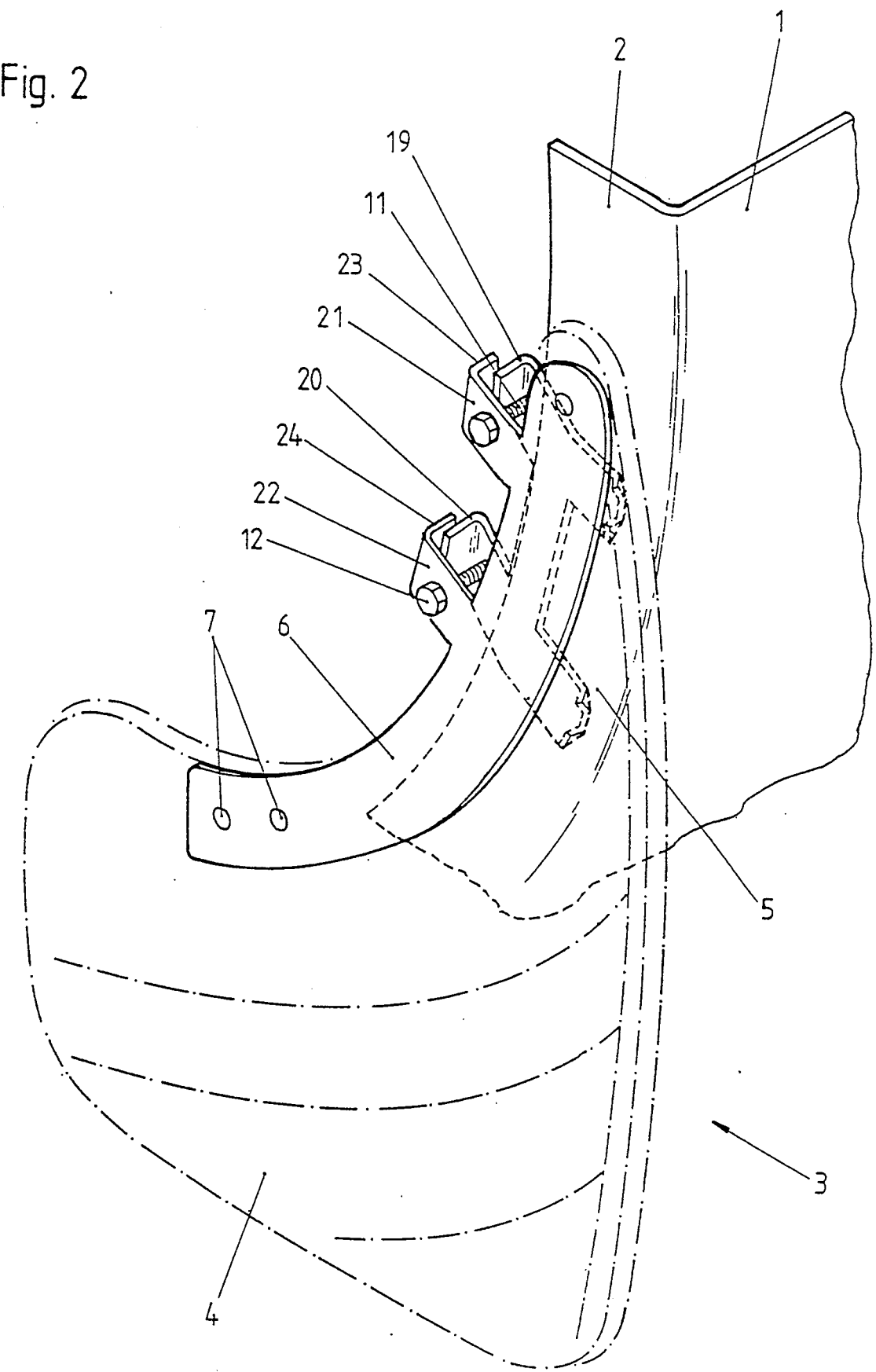
FIG. 2 shows the attachment of a mud-flap to the partially shown angled fender fold corresponding to FIG. 1.
Figure 3:
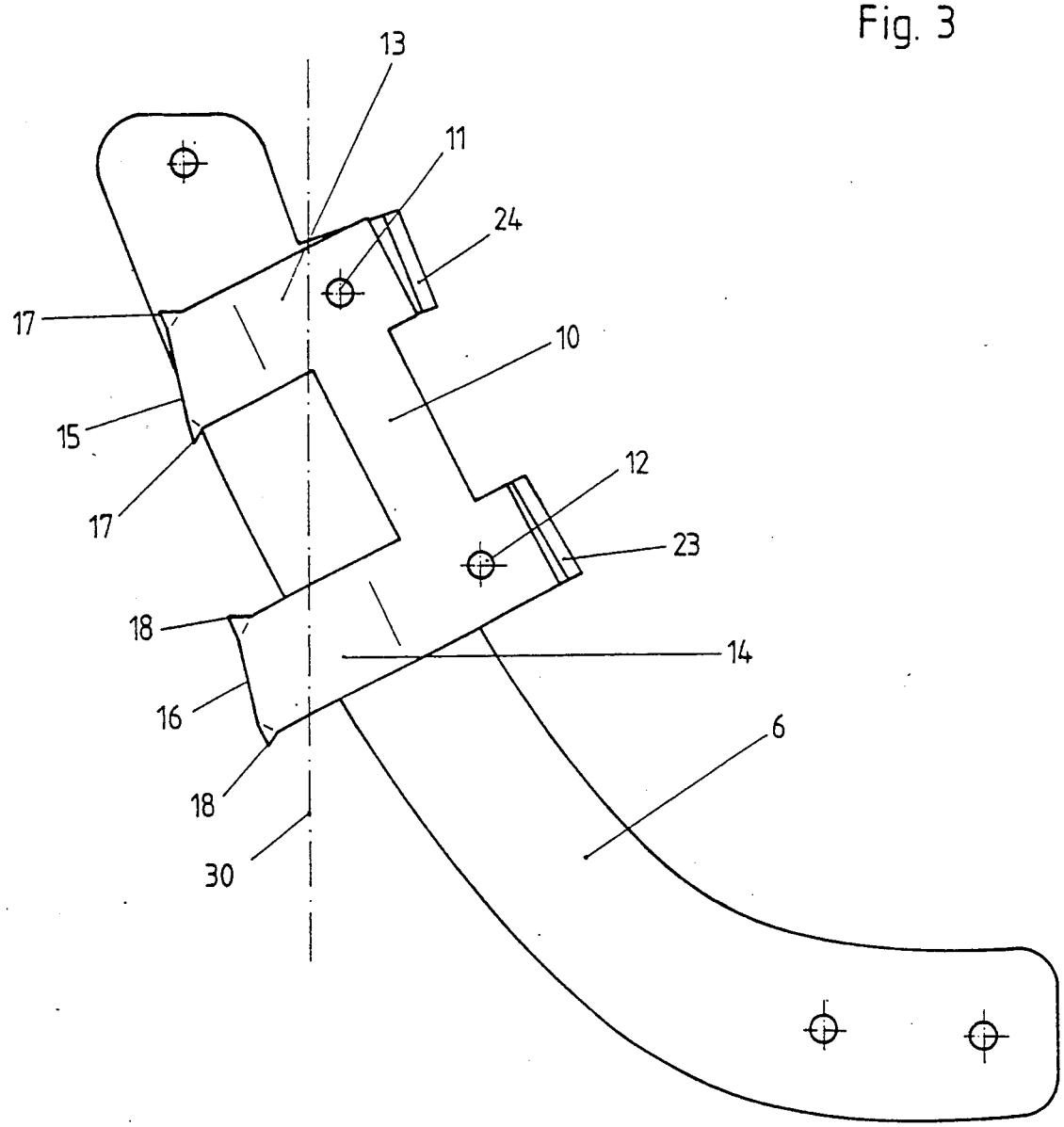
FIG. 3 shows a view of the parts which form a clamping part for the attachment device, as in FIG. 2, from a clamping part side.

In the embodiment illustrated in FIGS. 2 and 3, on the area of the mud-flap 3 that faces the wheel when mounted, i.e. the area facing away from the fender fold 2, in the region of the inner edge of the adapter protrusion 5, a deformable strengthening plate 6 is provided which is attached to the main flap body 4 and adapter protrusion 5 by means of rivets 7 at least in the region of the top edge of the main flap body 4 and top edge of adapter protrusion 5. The shape and purpose of this type of strengthening plate are described in U.S. Pat. No. 3,953,353. This strengthening plate is modified with the present invention so that it serves as one of the present clamping parts.

Thus, two spaced-apart first projecting parts 21, 22 are formed on the strengthening plate 6 and on the edge thereof situated on the inner edge of the adapter protrusion 5, which projecting parts essentially lie in the plane of the strengthening plate 6. At their free ends, first projecting parts 21 and 22 have first angle members 23 and 24. In the first projecting parts 21 and 22, there are through-holes through which screws 11, 12 are inserted and which screws act as the connection to the first clamping part 10 (see FIG. 3).

The first clamping part 10 has two tapped holes set, for example, 50 to 58 mm apart, through which the screws 11 and 12 extend. The clamping part 10 has two essentially parallel clamping projections 13, 14, i.e. an upper clamping projection 13 and a lower clamping projection 11, with both extending to an opposite side of the first clamping part from the side at which the screws are disposed. These clamping projections form a central recess therebetween with, for example, a width of 30 mm to 35 mm and which recess opens to the side of first clamping part 10 facing away from the screws 11 and 12. On the side of the clamping part 10 near the screws 11 and 12, there are second angle members 19 and 2( (see FIG. 2) which correspond to the first angle members 23 and 24 of the first projecting parts 21 and 22 and are arranged adjacent to the first projecting parts to form a support.

The free corner regions of the clamping projections 13 and 14 are angled in the direction of the other clamping part, i.e. in this case strengthening plate 6. The corner regions are, thus, inwardly directed, and thus form corner angled parts 17 and 18, which when the clamp is mounted, engage with the rear side of the fender fold 2 or with any coating material applied thereto, e.g. undercoating (see FIG. 2). Thus, the corner angled parts receive and engage the fender fold.

As can be seen from FIG. 3, the length of the upper clamping projection 13, i.e. from the associated upper screw 11 (which is arranged centrally in relation to this clamping projection 13) to the upper free outer edge 15, is shorter than the corresponding length of the lower clamping projection 14, i.e. the distance between screw 11 and free outer edge 15 of clamping projection 13 is less than the distance between screw 12 and free outer edge 16 of clamping projection 14. The difference in distances can be from about 10 to 60%, e.g. about 20 to 50%, e.g. about 40%. Moreover, as can be seen from FIG. 3, a line could be generated adjacent to and parallel to the two free outer edges 15 and 16 of the clamping projections 13 and 14, and such a generated straight line would form an acute angle with a straight line generated through the screws 11 and 12. The convergence or apex of such generated lines would lie above screw 11. As a result of such dispositions of the screws and clamping projections, the lowermost corners of corner angled parts 17 or 18 (see FIG. 3) of clamping projection 13 or 14 are at a greater distance from the associated screws 11 or 12 than the uppermost corners of corner angled parts 17 or 18.

With this asymmetrical construction of the two clamping projections 13 and 14, the mud-flap can be attached to a relatively steeply angled fender fold, as indicated by the dot-dash line 30 in FIG. 3, since even with a steeply angled fender fold, it is possible for the corners of the corner angled part 18 of the lower clamping projection 14 to contact a portion of such a fender fold and form a secure engagement with the rear side thereof. On the other hand, as can be appreciated, if the lower clamping projection 14 were the same length as that of upper clamping projection 13, then no engagement of the clamp with the steeply angled fender fold would be possible, at least with the lowermost corner of corner angled part 18 of clamping projection 14, as shown by dashed line 30. In many cases, the lower clamping projection 14 would not be able to come into clamping or gripping engagement on the fender fold at all. Such, however, would result in an inadequate attachment of the mud-flap.

Figure 4:
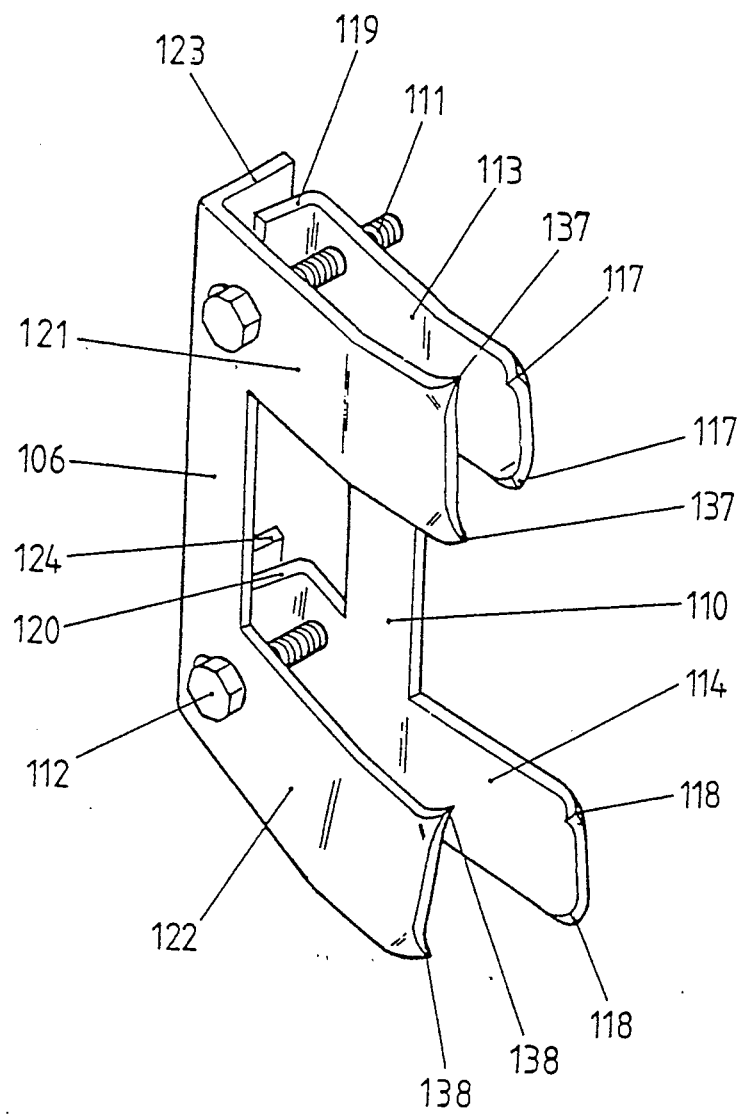
FIG. 4 shows another form of a clamp for the attachment of a mud-flap where each clamping part corresponds to the other clamping part.

In the embodiment shown in FIG. 4, the elements corresponding to the embodiment in FIGS. 2 and 3 are numbered with reference numbers increased by 100, and elements which have already been described are not described again. In this embodiment, instead of the strengthening plate 6 of FIG. 2 forming a clamping part, a second clamping part is provided which has a configuration substantially the same as the first clamping part shown in FIGS. 2 and 3.

Unlike the embodiment shown in FIGS. 2 and 3, where the first projecting parts 21 and 22 are formed on a strengthening plate 6, in the embodiment shown in FIG. 4, a second clamping part 106 cooperates with the first clamping part 11(, which second clamping part has second clamping projections 121 and 122, which correspond to the upper and lower clamping projections 13 and 14 of FIGS. 2 and 3 and 113 and 114 of FIG. 4. As shown, second clamping projections 121 and 122 are part of the second clamping part 106. Formed between the clamping projections 121 and 122 is a central recess, which is opened at the same side of clamping part 106 as the central recess between the clamping projections 113 and 114 of clamping part 110. These clamping projections 121 and 122 are angled at their free corners towards the first clamping part 110 and thus form corner angled parts 137 and 138, similar to corner angled parts 117 and 118, for engagement with the front face of the mud-flap or the fender fold. Also, on the side of the first clamping part 110 remote from the first clamping projections 113 and 114 and on the side of the second clamping part 106 remote from the second clamping projections 121 and 122, there is disposed at least one angle member 119 and 123 for supporting each clamping part and these members are receivable next to each other.

To attach the mud-flap to a fender fold, the mud-flap is brought into a position where it rests on the fender fold, and then the clamp, such as the clamp shown in FIG. 4, is moved to a suitable position over the fender fold so that the first clamping projections 113 and 114 grip behind the fender fold and the second clamping projections 121 and 122 lie on the face of the mud-flap facing away from the fender fold, or vice versa. Here, due to the different lengths of the clamping projections 113 and 114 and 121 and 122, it is possible, as explained in connection with FIGS. 2 and 3, to obtain a secure attachment even when the fender fold has a steep angle.

It should be noted that in both embodiments a particularly easy assembly onto the fender fold is possible. Thus, after alignment of the mud-flap, only one single clamp need be brought into clamping engagement with the fender fold. The clamp shown in the embodiment in FIGS. 2 and 3 will remain securely in place and hold the mud-flap in the desired position. Likewise, the mud-flap can also easily and securely be held in place by the embodiment shown in FIG. 4. On the other hand, if two separate clamps are required, as is common with prior art devices, considerable difficulties occur in assembly because two clamps can always move in relation to each other and in relation to the mud-flap during assembly.

What is claimed is:

1. In a mud-flap attachment device for detachably securing an upper portion of a mud-flap to a fender fold of a motor vehicle, wherein the attachment device has at least ore clamp having a first clamping part connected to a second clamping part by at least an upper screw and a spaced-apart lower screw so that the upper portion of the mud-flap and a portion of the fender fold may be received between said first and second clamping parts and inwardly of the screws whereby the mud-flap is securable to said fender fold by tightening said screws, the improvement comprising:

(1) an upper first clamping projection on an opposite side of the first clamping part from that side at which the upper screw is disposed;

(2) a lower first clamping projection on an opposite side of the first clamping part from that side at which the lower screw is disposed;

(3) an upper free outer edge on the upper first clamping projection and a lower free outer edge on the lower first clamping projection, with each of said outer edges having inwardly directed corner angled parts for receiving and engaging said upper portion of the mud-flap or said fender fold; and wherein the distance between the lower screw and the lower free outer edge is greater than the distance between the upper screw and the upper free outer edge.

2. The device of claim 1, wherein the upper first clamping projection and the lower first clamping projection have a central recess therebetween.

3. The device of claim 1, wherein said screws are disposed on a longitudinal central axis of the respective first clamping projections.

4. The device of claim 1, wherein the lower free outer edge when the clamp is mounted on the fender fold forms an acute angle with the line through the two screws, the apex of which angle is upwardly of the upper screw.

5. The device of claim 4, wherein the upper and lower free outer edges generally lie on a common line.

6. The device of claim 1, wherein on the side of the first clamping part remote from the first clamping projections there is disposed at least one first angled member for engagement with the second clamping part.

7. The device of claim 1, wherein the first clamping part or the second clamping part has tapped holes for receiving the screws.

8. The device of claim 1, wherein the second clamping part is a portion of a strengthening plate, which strengthening plate has second projecting parts for the engagement of the screws.

9. The device of claim 1, wherein the second clamping part has a configuration substantially the same as the first clamping part.

10. The device of claim 9, wherein on the side of the first clamping part remote from the first clamping projections, there is disposed at least one first angled member for engagement with the second clamping part and on the side of the second clamping part remote from the clamping projection, there is disposed at least one second angled member for engagement with the first clamping part, and wherein the first angled member or the second angled member is receivable next to the other.

* * * * *